Oct. 17, 1939.  S. J. NORDSTROM  2,176,594
HYDRAULIC VALVE
Filed May 23, 1936  4 Sheets-Sheet 1

INVENTOR.
Sven J. Nordstrom
BY Lewis D. Konigsford
ATTORNEY.

Oct. 17, 1939.  S. J. NORDSTROM  2,176,594
HYDRAULIC VALVE
Filed May 23, 1936  4 Sheets-Sheet 2

INVENTOR.
Sven J. Nordstrom.
BY
Lewis D. Konigsford
ATTORNEY.

Oct. 17, 1939.      S. J. NORDSTROM      2,176,594
HYDRAULIC VALVE

Filed May 23, 1936      4 Sheets-Sheet 3

INVENTOR.
Sven J. Nordstrom.

BY Lewis D. Kniggford
ATTORNEY.

Oct. 17, 1939.   S. J. NORDSTROM   2,176,594
HYDRAULIC VALVE
Filed May 23, 1936   4 Sheets-Sheet 4
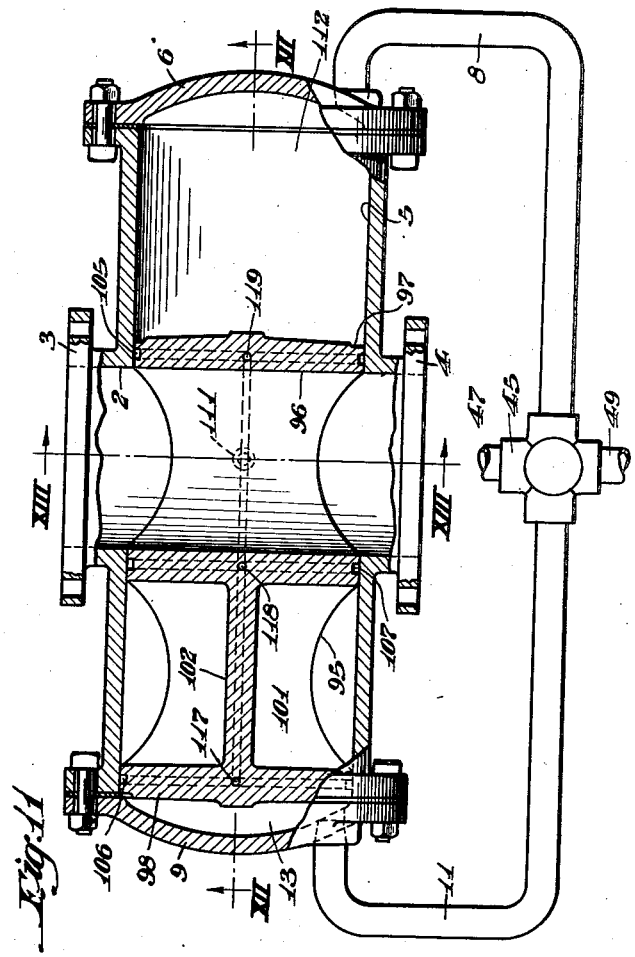
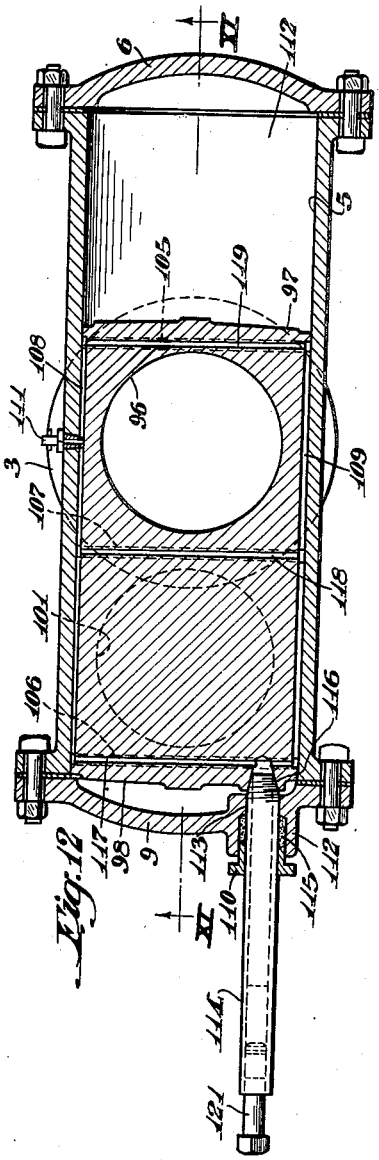
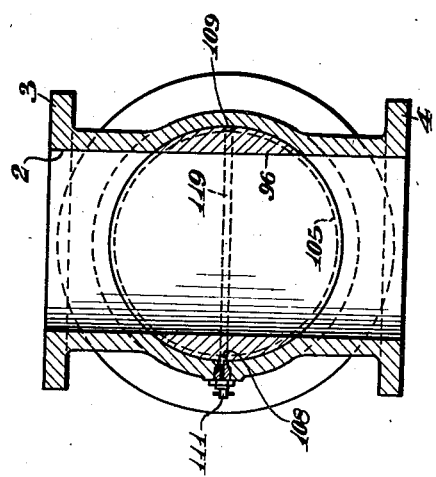
INVENTOR.
Sven J. Nordstrom.
BY
Lewis D. Kingsford
ATTORNEY.

Patented Oct. 17, 1939

2,176,594

UNITED STATES PATENT OFFICE 2,176,594

HYDRAULIC VALVE

Sven J. Nordstrom, Piedmont, Calif., assignor to Merco Nordstrom Valve Company, Pittsburgh, Pa., a corporation of Delaware Application May 23, 1936, Serial No. 81,458

1 Claim. (Cl. 251—65)

This invention relates to valves for controlling the flow of fluid, and relates more particularly to valves having expansible sections which are expanded by fluid or spring pressure into sealing relationship with the valve seat.

In closed fluid conduit systems such as water works, sewage systems and the like, valves of relatively large size are frequently required. In the heretofore known valves used in such installations the large size of the valve and its resistance to movement requires that a large force be available for moving the valve, and it has been difficult to accomplish complete sealing against leakage past the valve.

Accordingly, it is an object of my invention to provide a valve construction which may be made in large sizes and which is easy to operate between open and closed positions.

It is a further object of the invention to provide a valve which is operated by fluid pressure, and the operation of which may be controlled from a point remote from the valve itself.

It is a further object of this invention to provide a valve which will operate easily and smoothly between open and closed positions so as to eliminate liability of the valve becoming stuck in its casing.

A further object is to provide a valve having a lubricating groove system for lubricating and sealing the valve member.

A further object of the invention is the provision of a valve having a system of lubricant grooves in its surface which are not exposed to line fluid in the operation of the valve.

It is a further object to provide a valve having expansible sections which are moved into contact with the valve seat by a spring or fluid pressure to seal the valve against leakage, and which may be released from contact with the valve seat to permit easy operation of the valve.

Still another object is the provision of a valve having retractible members adapted to engage the valve seat, and wherein means is provided for lubricating the valve seat to reduce wear and friction and assist in the sealing of the valve.

Still another object of the invention is the provision of a piston type of valve having an indication extending to the exterior of the casing so that the position of the valve may be determined by noting the position of the indicator.

These and other objects of the invention will be apparent from a consideration of the annexed drawings taken in connection with the following specification wherein:

Figure 11 is a horizontal cross section of a further modification taken on line XI—XI of Figure 12;

Figure 12 is a horizontal cross section view taken on line XII—XII of Figure 11; and Figure 13 is a transverse cross section view taken on line XIII—XIII of Figure 11.

Figure 1:
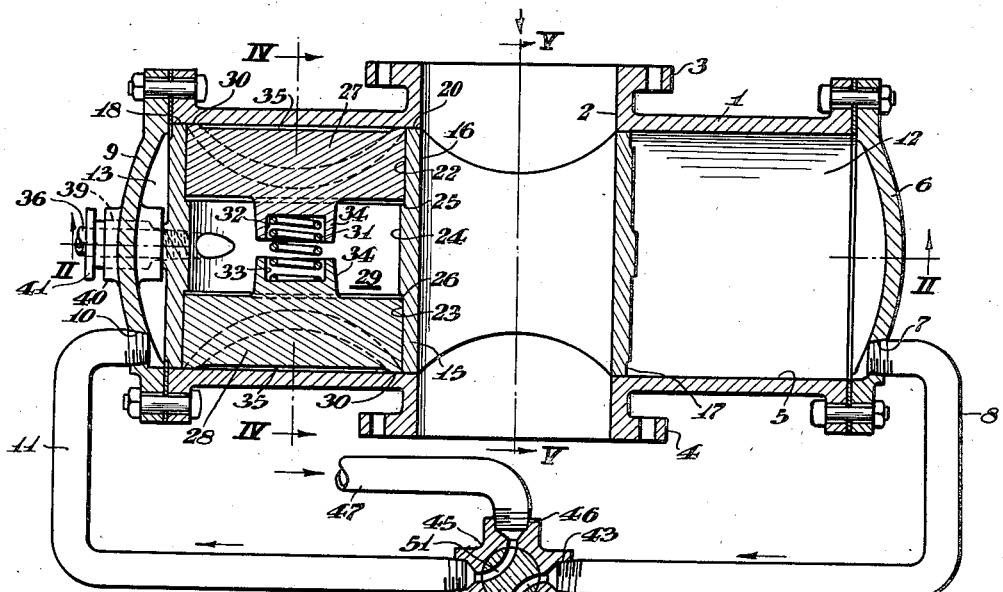
Figure 1 is a horizontal cross section view of a preferred modification taken on the line I—I of Figure 2.

Referring to the drawings, and specifically to Figures 1 to 6 in which is shown a preferred modification of the invention, the valve comprises a T-shape casing 1 having a fluid passageway 2 therethrough terminating in flanges 3, 4 whereby the casing is connected to a pipe line so that the passageway 2 becomes substantially a continuation thereof. The casing has a cylindrical bore 5 extending on both sides of the passageway 2, and adapted to be closed at one end by a cover 6 bolted or otherwise secured thereto and having a threaded opening 7 therein to which a pipe 8 schematically shown is adapted to be connected. The opposite end of the cylinder 5 is adapted to be closed by a similar cover 9 having a similar threaded bore 10 therein for connecting with a pipe 11. End chambers 12 and 13 are thus formed between the ends of the piston 15 and the covers 6 and 9 respectively.

A piston valve member 15 located in the hollow cylinder 5 is adapted for sliding axial movement therein, and adjacent one end thereof is a transverse cylindrical opening or port 16 therethrough adapted to communicate with the passageway 2 through the casing in open position of the valve. The piston member 15 has flanges 17, 18 at both ends which provide substantially close fitting bearing surfaces that may be sealed by suitable piston rings if desired. A similar flange 20 is formed intermediate the ends of the piston and likewise may be sealed by a piston ring if desired. It will be observed that the passageway 16 is sealed by the flanges 17 and 20 so as to prevent leakage therefrom longitudinally of the valve cylinder 5.

Figure 4:
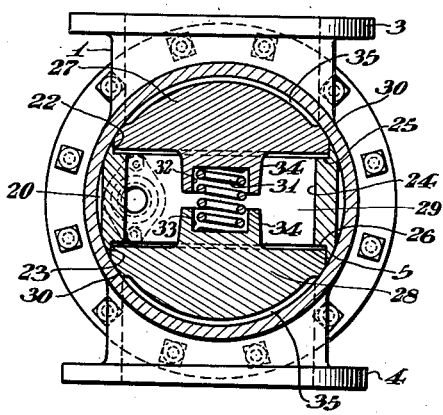
Figure 4 is a transverse cross section view taken on the line IV—IV of Figure 1.
Figure 5:
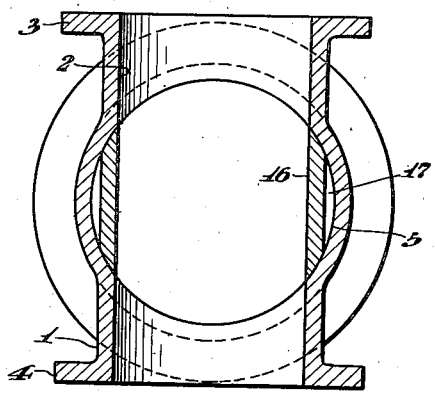
Figure 5 is a cross section view taken on line V—V of Figure 1.
Figure 6:
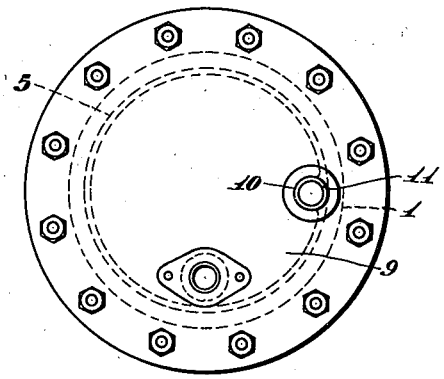
Figure 6 is an end elevation as viewed from the left in Figure 2.
Figure 9:
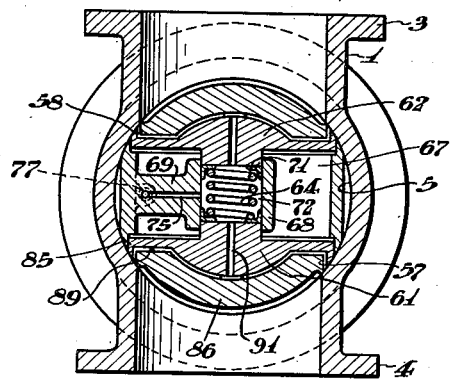
Figure 9 is a cross section view taken on line IX—IX of Figure 7.
Figure 10:
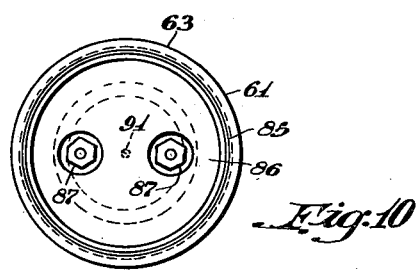
Figure 10 is an elevation of one of the plug members.

The opposite end of piston 15 is bored transversely of its longitudinal axis as indicated at 22 and 23 to provide circular bores extending transversely into the piston body but terminating short of the center in a cored thickened portion 24 providing limiting shoulders 25 and 26. Plug members 27 and 28 are inserted in the bores 22 and 23 respectively, these plugs or pistons being segmental shape in cross section as shown in Figure 4, and having their outer faces 30 cylindrical. A chamber 29 thus is provided on the interior of valve piston 15 between the cylindrical plugs 27 and 28. The cylindrical plugs 27 and 28 are adapted to be held in extended position against the surface of cylindrical bore 5 by a spring 31 in the chamber 29 fitting into suitable recesses 32 and 33 provided in lugs 34 on the interior faces of cylindrical plugs 27 and 28. The transverse depth of the plugs relative to the piston axis is such that when they are in extended position a clearance is provided between the inner edges of the plugs and the shoulders 25, 26 respectively. The cylindrical faces 30 of the pistons are relieved as indicated at 35 to provide a clearance between the faces and the cylinder 5.

A pipe 36 extends through the bore 37 in the cover 9 and is threaded or otherwise secured in a bore 38 in the end of valve piston 15 connecting with the chamber 29. A packing recess 39 is formed in a lug 40 in the cover 9 surrounding the pipe 36, and a gland 41 is adapted to compress packing material therein to prevent leakage along the pipe 36 and allow longitudinal movement thereof when the piston moves axially. A three-way valve 42 in pipe 36 enables the operator to connect the chamber 29 with a source of pressure through pipe 42p, or to a discharge through pipe 42d.

Figure 2:
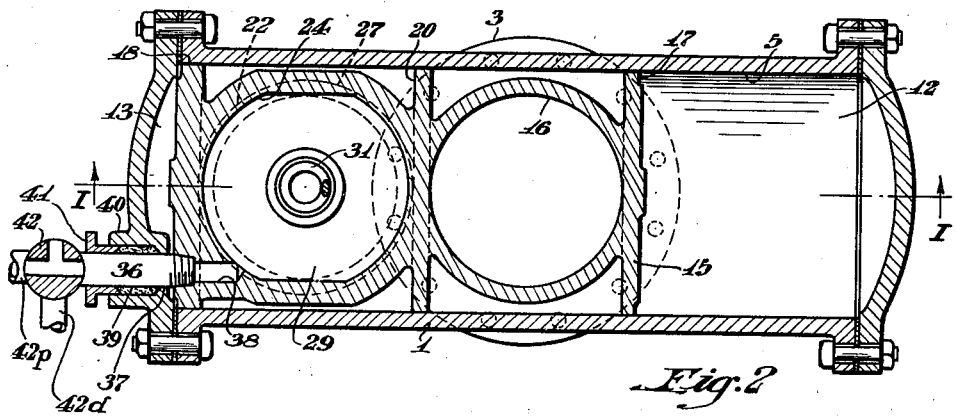
Figure 2 is a vertical cross section view taken on the line II—II of Figure 1.
Figure 3:
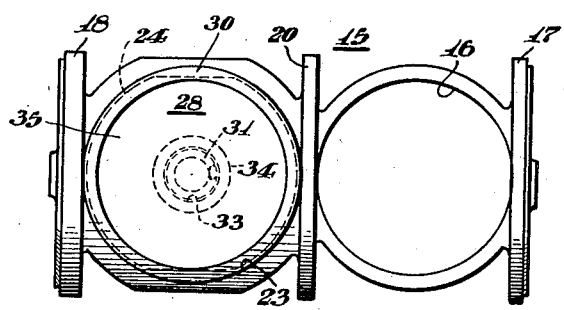
Figure 3 is a top elevation of the valve member as viewed in Figure 1.

The valve is shown in open position in Figures 1 and 2 and it will be seen that the pipes 8 and 11 communicate with the end chambers 12 and 13 respectively and with the passages 43 and 44 of a control plug valve 45 of any suitable type. The inlet passage 46 of the control valve 45 is connected by a pipe 47 to a source of fluid pressure and the outlet side 48 of the four-way valve is connected by pipe 49 to any suitable discharge. Passageway 51 in the plug 53 of valve 45, in the position shown in Figure 1 connects the high pressure connection 46 with the end chamber 13 by means of pipe 11, and passageway 52 in the plug 53 connects the pipe 8 and end chamber 12 with the low pressure connection 48.

The operation of the valve will now be described. When it is desired to close the piston valve 15 the plug 53 of control valve 45 is turned to the position shown in Figure 1 so that fluid from the high pressure pipe 47 is admitted to the chamber 13 at one end of the piston through control valve passage 51 and connecting pipe 11. At the same time the pipe 8 connected to the end chamber 12 connects through the control valve passage 52 to the outlet or low pressure pipe 49. The fluid pressure in chamber 13 thereupon moves the piston longitudinally from left to right as viewed in Figures 1 and 2 to bring the cylindrical plugs 27 and 28 into position where they block the passageway 2 through the valve as the fluid in chamber 12 is forced therefrom through pipe 8. It will be noted that the spring 31 maintains the plugs 27 and 28 in their outermost position against the cylinder wall 5. The spring action is independent of the amount of line pressure because leakage into chamber 29 of line fluid equalizes the effect of line pressure. The tube 36 travels with the piston and serves as an indicator to indicate the position of the valve. Should the valve be difficult to move the pressure within chamber 29 may be diminished by connecting valve 42 with pipes 36 and 42d to permit escape of some of the fluid in chamber 29 and when the piston reaches its closed position the valve 42 may be moved to the position shown in Figure 2 to connect chamber 29 with the source of pressure delivered from pipe 42p. The piston valve 15 is opened by turning the control valve counterclockwise through 90° to bring control valve passage 52 into communication with pipes 47 and 8, and control valve passage 51 into communication with pipes 11 and 49.

Figure 7:
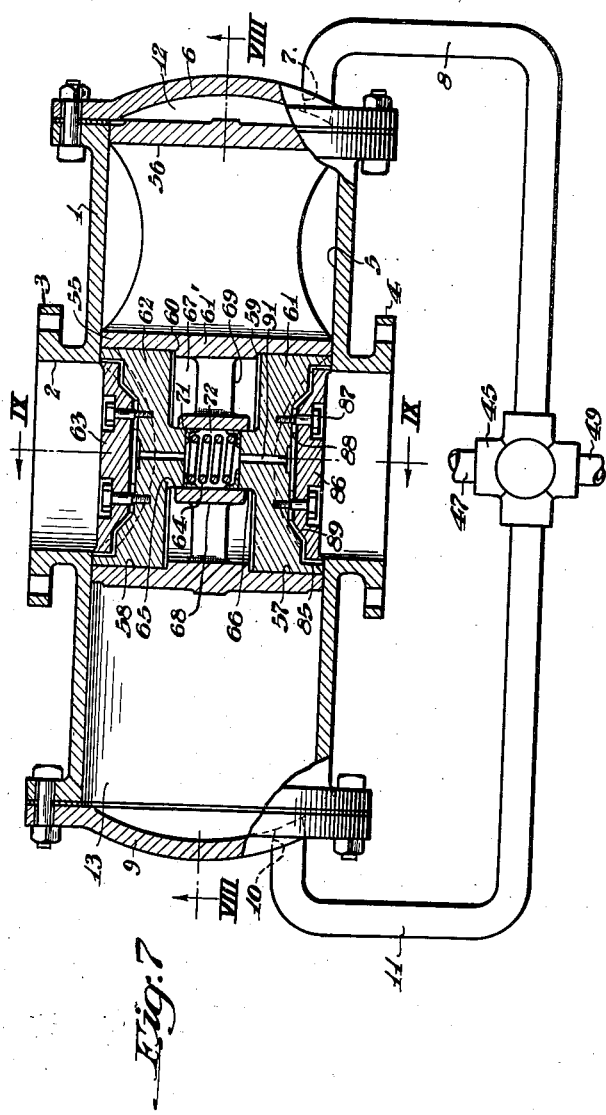
Figure 7 shows a modification in vertical section taken on line VII—VII of Figure 8.
Figure 8:
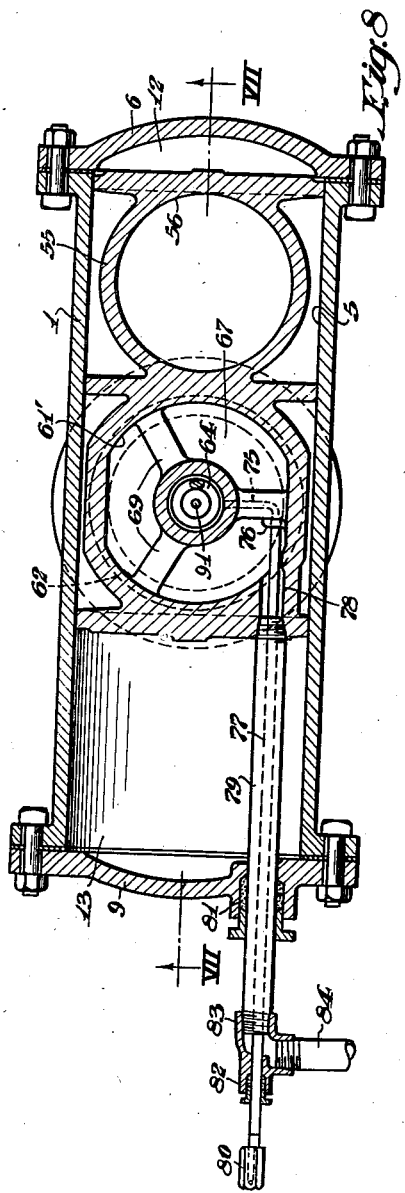
Figure 8 is a cross section view taken on line VIII—VIII of Figure 7.

In the modification shown in Figures 7, 8, 9 and 10, corresponding parts are indicated by like numerals. In this modification a piston 55 is located in the casing 1 and has a transverse bore 56 therethrough adapted to register with the fluid passageway 2 in open position of the valve. In Figures 7 and 8 the valve is shown in closed position. At one end the cylinder 55 is transversely bored as indicated at 57 and 58, the bores terminating in shoulders 59 and 60 adjacent the center, providing a thickened portion 61' in the valve piston. Plug members 61 and 62 which are segmental shaped in cross section are inserted in the bores 57 and 58 respectively, the outer faces 63 of these pistons being cylindrical. The cylindrical plugs 61 and 62 are held in extended position against the surface of the cylindrical bore by a spring 64 abutting lugs 65 and 66 on the inner faces of the piston members. A member 67 is formed between the inner faces of the plug members 61, 62, and a central hollow hub 68 held in place by radial arms 69 houses the spring 64. Packing members 71 are located in the hub 68 and are abutted by the spring 64 to provide a sealed chamber 72 on the interior of the hub 64.

One of the radial webs 69 is bored as indicated at 75 and has a bored thickened portion 76 to which a tube 77 is suitably secured, as by screw threads. The piston member 55 at one end has a bore 78 communicating with chamber 67, which receives the pipe 79 passing through a suitable stuffing box 81 in the cover 9. It will be seen that the tube 77 extends substantially concentric through the pipe 79 and extends through a suitable stuffing box 82 formed in an elbow or T-fitting 83 threaded on the outer end of pipe 79. A screw or piston 80 threaded into tube 77 forces lubricant before it with chamber 72. The pipe 84 connected to the fitting 83 carries a three way valve (not shown) similar to valve 42 with similar pressure and discharge connections.

As the cylindrical plugs 61 and 62 are exactly alike in construction only one plug will be described in detail. The plug 61 has a circular recess or bore 85 in its cylindrical face in which a filler member 86 is located and held in place by countersunk screws 87, suitable spacing washers 88 providing a clearance 89 between the filler member 86 and the cylindrical plug 61. The plug 61 has a transverse bore 91 which communicates at one end with the central chamber 72 within the hub 64, and at the other end with the clearance 89.

The operation of this modification in moving the piston 55 between open and closed positions is similar to that described in connection with the modification shown in Figures 1 to 5, a four way control valve 45 being provided for this purpose. It will be noted that the pipe 79 which carries fluid pressure to or from the intermediate chamber 67 is in free communication therewith, while the lubricant conduit 77 connects with the conduit 75 leading into central lubricant chamber 72 which is sealed off from chamber 67. When it is desired to lubricate the valve the screw or piston 80 is turned inwardly thus forcing a charge of lubricant through the conduits 77 and 75 into central chamber 72, and from thence through transverse bore 91 into the clearance 89 and against the cylindrical valve seat 5 and cylindrical surface 63 of the plug members. The lubricant provides a seal to prevent the flow of fluid around the valve, and lubricates the sliding surfaces of the piston 55 and cylinder 5 to facilitate the operation of the valve.

In the modification shown in Figures 11, 12 and 13, the piston valve member 95 adapted for sliding axial movement in the hollow cylinder 5, has a transverse cylindrical opening or port 96 therethrough adjacent one end adapted to communicate with the passageway 2 through the casing, in open position of the valve. The piston member 95 has flanges 97 and 98 at its ends which provide substantially close fitting bearing surfaces that are sealed by lubricant in a manner presently to be described. A similar flange 99 is formed intermediate the ends of the piston and likewise is adapted to be sealed by lubricant. It will be observed that in the open position of the valve the passageways 2 and 96 are sealed by the flanges 97 and 99, and in the closed position of the valve the passageway 2 is sealed by the flanges 99 and 98, so as to substantially prevent leakage longitudinally of the valve cylinder 5. The opposite end of the piston 95 may be cored out as indicated at 101 leaving a central dividing wall 102 so as to reduce the weight on the piston.

Each of the flanges 97, 98 and 99 have formed therein circumferential extending lubricant grooves 105, 106 and 107 respectively, and there are two diametrically opposite longitudinally extending grooves 108 and 109 in the surface of the piston 95 which communicate with the circumferential grooves 105, 106 and 107. Lubricant may be supplied to this groove system by a fitting 111 of any suitable construction such as "Alemite" type of fitting suitably secured in a side wall of the hollow cylinder 5.

If desired, an additional lubricating fitting may be employed. For this purpose, the cover 9 has a thickened lug 112 having a hole 113 therein through which a pipe 114 passes and is suitably threaded into the piston member 95. A gland 114 is employed to compress the packing in stuffing box 115 to prevent leakage therethrough. The pipe 114 is threaded into a passage 116 in the piston member which communicates with a diametrical lubricant duct 117 at one end of the valve. Similar diametrical lubricant ducts 118 and 119 are located in the piston member at the location of the circumferential grooves 107 and 105 respectively. These grooves aid in the distribution of lubricant throughout the surface groove system. The pipe 114 is internally threaded adjacent its outer end, and a suitable screw 121 is threaded into the pipe. When the pipe 114 is filled with lubricant the screw 121 may be screwed inwardly to compress the lubricant and distribute it to the lubricant groove system.

The operation of the valve will now be described. The mode of actuating the valve between open and closed positions is described in connection with the modifications shown in Figures 1 to 10, and need not be again described in detail. Briefly, when hydraulic pressure is introduced into chamber 13 the piston is forced longitudinally to the right thus expelling fluid from the chamber 12, whereby the valve is closed. When the valve is in closed position and hydraulic pressure is introduced into the chamber 12, the fluid in chamber 13 is expelled thus allowing the valve to open. When the lubricant pipe 114 is employed without the fitting 111, lubricant in stick or other suitable form is inserted in the pipe 114, and the screw 121 is turned inwardly to distribute lubricant through the diametrical duct 117, circumferential groove 106, and from thence by means of longitudinal grooves 108 and 109, to the circumferential grooves 107 and 105. The diametrical ducts 118 and 119 assist in properly distributing the lubricant. In the open position of the valve the passageway 2 therethrough is surrounded by a system of lubricant grooves comprising the two circumferential grooves 105 and 107, and two longitudinal grooves 108 and 109 which are diametrically opposite each other. In this position a complete seal around the passageway is formed by these grooves. In the closed position of the valve the passageway 2 is sealed by the circumferential grooves 107 and 106, and longitudinal grooves 108 and 109 to form a complete seal around the passageway. It will be observed that the grooves 108 and 109 are so located that at no time are they exposed to line fluid.

When the fitting 111 is employed without the pipe 114 to lubricate the valve, it is preferable that some means be employed to prevent the piston 95 from rotating. This is conveniently done by providing an extension on the fitting 111 as shown which extends into the longitudinal groove 28 and thus prevents rotation of the piston. This extension has the added advantage that it assists in circulation or distribution of lubricant through the groove by pushing lubricant ahead of it as the piston moves back and forth.

It will be evident that the longitudinal grooves 108 and 109 need not necessarily be exactly longitudinal, as there is a considerable area provided wherein these grooves may be located without their being exposed to line fluid.

As the invention may be embodied in other specific forms without departure from the spirit or essential characteristics thereof, the present preferred embodiment is therefore considered as illustrative rather than restrictive of the invention.

What is claimed and desired to be secured by United States Letters Patent is:

A valve comprising a casing having a passageway therethrough for flow of fluid and a cylindrical bore formed through the casing transversely of the passageway, a piston axially slidable in the bore, said piston having a plurality of flanges providing cylindrical faces engaging said cylindrical bore and reduced portions between said flanges, said piston having a port therethrough adjacent one end adapted to register with the passageway in open position of the valve, a plurality of extensible plugs having cylindrical faces adjacent the other end of said piston in the reduced portion thereof and providing a fluid chamber therebetween, means for introducing fluid under pressure into said fluid chamber to vary the outward force exerted on said plugs, and means independent of said fluid pressure for moving said piston axially in said bore.

SVEN J. NORDSTROM.